Oct. 11, 1960

G. A. MARSH ET AL 2,956,225

CORROSION TESTING APPARATUS

Filed Sept. 25, 1957

INVENTORS
GLENN A. MARSH
BY EDWARD SCHASCHL

ATTORNEY

Oct. 11, 1960

G. A. MARSH ET AL 2,956,225

CORROSION TESTING APPARATUS

Filed Sept. 25, 1957

INVENTORS
GLENN A. MARSH
BY EDWARD SCHASCHL

*Edward H. Lang*
ATTORNEY

Oct. 11, 1960　　　G. A. MARSH ET AL　　　2,956,225
CORROSION TESTING APPARATUS

Filed Sept. 25, 1957　　　3 Sheets-Sheet 3

INVENTORS
GLENN A. MARSH
EDWARD SCHASCHL
BY
ATTORNEY

United States Patent Office 2,956,225
Patented Oct. 11, 1960

2,956,225

CORROSION TESTING APPARATUS

Glenn A. Marsh and Edward Schaschl, Crystal Lake, Ill., assignors to The Pure Oil Company, Chicago, Ill., a corporation of Ohio Filed Sept. 25, 1957, Ser. No. 686,139

6 Claims. (Cl. 324—71)

This invention relates to an apparatus for measuring the corrosivity of confined atmospheres, incorporating means for mitigating the effect of rapid temperature fluctuations on the test results. More particularly, this invention relates to a corrosion-test probe including exposed test specimens and means, including a sleeve with variable openings, to allow the corrosive atmosphere to contact the test specimens and also allow measurements to be taken without the effect of rapid temperature fluctuations thereon. The invention lies particularly in the arrangement of a movable and a stationary sleeve about the test specimens, providing apertures in both the movable and the stationary sleeve, means for moving said movable sleeve so that the apertures register and allow the corrosive atmosphere to contact the test specimens, and also to close the sleeves during that period wherein a measurement is being taken.

The test probe of this invention is adapted to be used with various base elements designed for insertion of the test probes into pressure vessels. The test probe of this invention utilizes the direct observation of the influence of corrosion under actual service conditions and disadvantages due to the heterogeneity of the corrosive environment are overcome. The probe also takes advantage of the methods that have been devised to make use of the correlation between change in electrical conductivity and change in cross-sectional area to determine the rate of corrosion of various materials of construction through the use of corrosion-test probes connected to electrical resistance-change meters. Such instruments, known and widely used in the art, employ resistance bridges and function like analogue computers to indicate quantitatively the changes in physical characteristics which cannot be conveniently measured by other methods.

There are several recent modifications of this principle, as that described in a co-pending application entitled, "Apparatus for Determining the Influence of Corrosion on Metallic Materials of Construction," bearing Serial Number 528,032, filed August 12, 1955, by the present inventors. Application Serial Number 528,032 describes means for compensating for temperature changes wherein one test specimen is mounted in exposed condition to the corrosive atmosphere and another test specimen is insulated or protected from the corrosive atmosphere by means of a suitable protective coating placed thereon. The coupons or test specimens are connected in a circuit so as to comprise one-half of a typical resistance bridge. Suitable electrical connections are made with the other half of the bridge, which is placed outside the corrosive environment along with the power supply to the bridge, and an appropriate electrical meter, such as a galvanometer, functions as a null detector. Loss of metal on the unprotected specimen induces small increases in resistance in the circuit which are correlated with metal loss by appropriate formulae described in the application.

In another co-pending application entitled, "Electronic Resistance-Change Meter," Serial Number 528,061 filed August 12, 1955, now Patent No. 2,830,265, by Lynn E. Ellison, there is described an electronic apparatus for conveniently detecting and measuring changes in resistance which provides for direct reading of the rate of corrosion. The corrosion-test probe of the present invention may be used in conjunction with the apparatus described in the foregoing applications. In still another co-pending application by the present inventors entitled, "Improved Corrosion-Test Probes for Use With Corrosion-Testing Apparatus," filed March 1, 1957, and bearing Serial Number 568,906, now Patent No. 2,851,570, there are described corrosion-test probes of increased rigidity, durability and strength. These probes comprise a non-conducting specimen holder which may be in the form of a ceramic core having test specimens attached to the surface thereof by electrolytic deposition or painted circuit methods. The corrosion-test probe of this invention is in part an improvement over the test probe previously proposed in that it is adapted to be used under conditions of both high pressure and temperature, is adapted to be connected and disconnected from the corrosive environment without the necessity of relieving the pressure conditions therein, and overcomes the difficulties due to temperature fluctuations.

Accordingly, it becomes a primary object of this invention to provide a corrosion-test probe to be used with an electronic resistance-measuring apparatus adapted to determine the corrosivity of environments under conditions of relatively high, fluctuating temperatures and pressures.

Another object of the invention is to provide a new form of protector sleeve and sliding mechanism for a corrosion-test probe.

Another object of the invention is to provide a corrosion-test probe specimen housing which is adapted to compensate for rapid temperature fluctuations.

The invention is best described in relation to the drawings in which.

Figure 2:
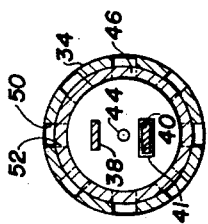
Figure 2 is a cross-sectional view taken along lines 2—2 of Figure 1.
Figure 1:
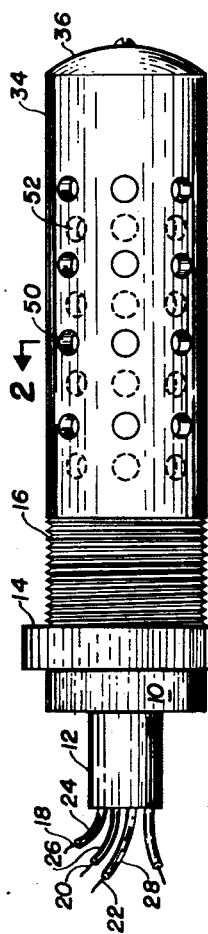
Figure 1 is a plan view of one form of corrosion-test probe.

Referring to the drawings, particularly Figures 1–4, one embodiment of the test probe of this invention is shown with base member 10 having extension 12, shoulder 14 and threaded portion 16. Threads 16 are for the purpose of engaging a threaded aperture through the wall of the vessel (not shown) to hold the test probe within the corrosive atmosphere. Leads 18, 20 and 22 pass through base member 10 in insulated and pressure-sealed relationship. The insulated portions 24, 26 and 28 constitute the means for connecting the test probe with the electronic measuring apparatus (not shown). Base 10 has a second shoulder 30 and internal extension 32 which is also threaded. External sleeve 34 is threaded internally at its open end to engage the threads on extension 32, and has a closed end formed by wall 36.

An exposed test specimen 38 and a protected test specimen 40, having coating 41, are connected to leads 18 and 22 in base 10, and have common juncture 42 and common lead 44, the latter being connected to lead 20. The test specimens 38 and 40 are housed within external sleeve 34 and internal sleeve 46 having end-wall 48. Sleeve 46 fits in slideable relationship within sleeve 34. Sleeve 34 has a plurality of evenly spaced apertures 50 extending through the wall thereof. Sleeve 46 has a similar pattern of spaced apertures 52. Item 54 constitutes means for moving sleeve 46 longitudinally and may comprise an electromagnetic device, such as a solenoid having plunger 56 and return spring 58. Solenoid 54 is held to end-wall 36 of sleeve 34 by means of screw 60, and plunger 56 is held to wall-member 48 of sleeve 46 by means of screw 62. An additional pair of leads 64, insulated as at 66, pass through base 10, along the inner wall of sleeve 46 through aperture 68, and connects to solenoid 54. Spring 58 may be located between the open edge of sleeve 46 and base 12. Lead 66 may be of flexible construction and attached to sleeve 46, or of rigid construction and allowed to slide in aperture 68.

Figure 4:
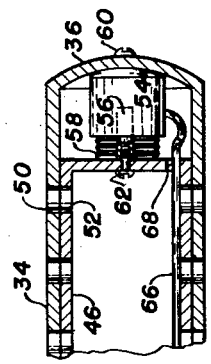
Figure 4 is a partial cross-section of the end of the probe of Figure 3 to show the co-operation of parts.
Figure 3:
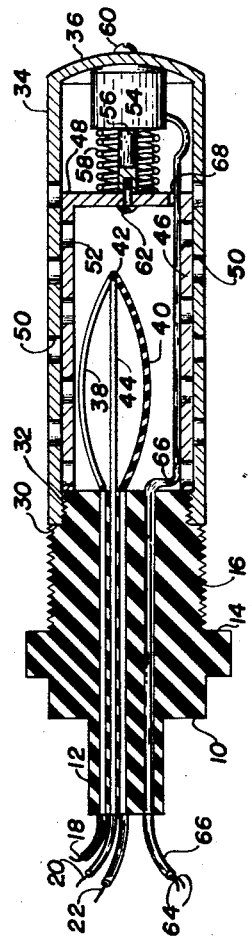
Figure 3 is a longitudinal cross-sectional view of the embodiment shown in Figure 1.

Figure 3, in one embodiment, shows the position of the parts and their relation to one another during the taking of a reading of the rate of corrosion. In Figure 4 the parts may be considered in their positions during that period in which the corroding atmosphere is entering the registered apertures 50 and 52 and acting on exposed test specimen 38. Either Figure 3 or Figure 4 could be the "On" position, or electrically-actuated position of the solenoid 54. Since the length of time during which a reading is being taken is short compared with the time of contact with the corrosive atmosphere, in one embodiment, Figure 3 represents the position of solenoid 54 when "On" and Figure 4 shows solenoid 54 in "Off" position. The reverse arrangement is also contemplated wherein Figure 3 shows solenoid 54 in "Off" position and it is actuated during the exposure of the test element 38 to the corrosive atmosphere as in Figure 4. Still another alternative is contemplated wherein the apertures of sleeve 46 are normally in such a position as to register with apertures 50 in sleeve 34 when the solenoid is in "Off" position in Figure 3 and do not register when the solenoid 54 is "On" with the solenoid 54 in the position shown in Figure 4. Also, it is obvious that in accordance with this last alternative the solenoid may be "On" when the parts are in the position of Figure 3 with the apertures 50 and 52 registering, and "Off" when the parts are in the position shown in Figure 4, except that the apertures do not register. Thus, spring 58 may be a compression spring or a retaining spring. In each of these embodiments the movement of sleeve 46 is limited in its movement in one direction by its base or open end striking base 10, and is limited in movement in the other direction by the inherent qualities of spring 58 and solenoid 54.

Figure 6:
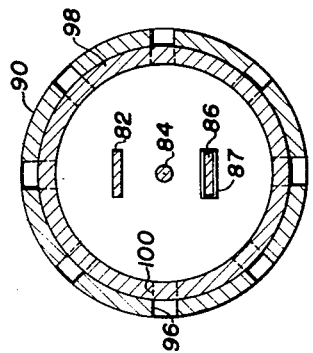
Figure 6 is a cross-section taken along lines 6—6 of Figure 5.
Figure 5:
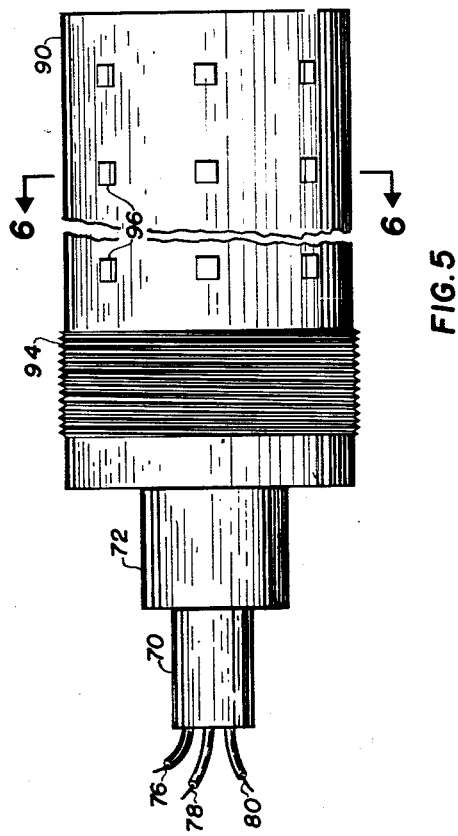
Figure 5 is a plan view of another form of the corrosion-test probe of this invention.
Figure 7:
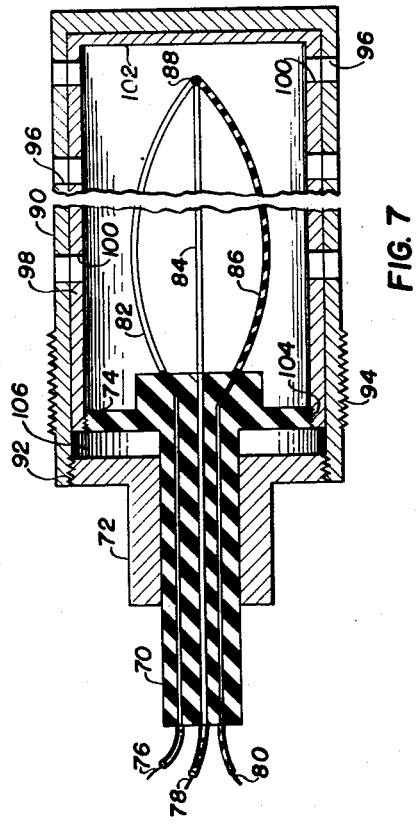
Figure 7 is a cross-sectional view of the embodiment shown in Figure 5.

In Figures 5–7 another embodiment of the invention is shown wherein base or movable support 70 is an elongated member, preferably made of insulating material, extending in a sliding relationship through collar 72 and terminating in plate 74. Base 70 carries leads 76, 78 and 80 in insulated and pressure-sealed relationship, connecting to the measuring apparatus at one end and to exposed test specimen 82, common lead 84, and protected test specimen 86 having coating 87 and common juncture 88 at the other end. Sleeve housing 90 engages collar 72 by means of threads 92. Sleeve 90 is equipped with threads 94 to engage the threaded aperture in the vessel wall through which the probe is inserted. Sleeve 90 has a plurality of spaced apertures 96. Slideably fitted within sleeve 90 is inner sleeve 98 which has apertures 100 and end-wall-member 102. Sleeve 98 engages plate 74 by means of threads 104. Sleeve 98 is shorter than the inside of sleeve 90, leaving space 106 whereby the sliding movement of base 70 moves sleeve 98 within sleeve 90 to open or close the register between apertures 96 and 100, which are shown in open position in Figure 7. Figure 6 shows the relative position of the apertures or parts 96 and 100 when sleeve 98 and base member 70 are retracted.

The test probe is shown in Figure 7 with the apertures 96 and 100 registering so that the corrosive atmosphere may enter to act on the exposed test specimen 82. During the taking of the corrosion-rate reading, base member 70 and attached sleeve 98 are moved so that the apertures no longer register and the atmosphere surrounding the test elements within the sleeve 98 is not subject to temperature fluctuations during the reading of the corrosion-rate meter.

Figure 8:
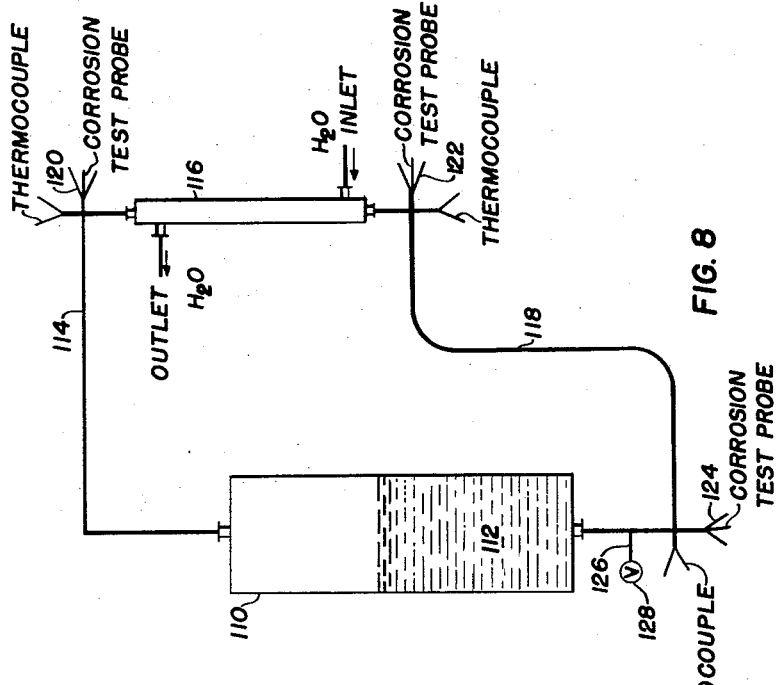
Figure 8 is a flow diagram of an apparatus used to conduct experiments to illustrate the necessity for protecting the test specimens from rapid temperature fluctuations during corrosion measurements.

In order to demonstrate the necessity of shielding the test specimens of construction material during the taking of meter readings, the apparatus shown in Figure 8 was assembled. Item 110 represents a boiler supplying vapors of liquid 112 to vapor line 114 connected to condenser 116 and condensed liquid recycle line 118. Corrosion-test probes and thermocouples were placed at 120, 122 and 124 extending through the wall of the conduits into contact with the vapors or liquid therein. Drain 126 was controlled by valve 128. The corrosion-test probes 120, 122 and 124 were standard, unshielded probes and experiments were conducted to determine the corrosivity of phenol as the liquid 112 under various conditions, that is, in the vapor phase, during condensation and in the liquid phase. The results are shown in the table:

*Table*

| Time (hrs.) | In Boiling Liquid | | In Condensing Vapor | | In Condensed Liquid | |
|---|---|---|---|---|---|---|
| | Temp. | Corrosion Meter Reading | Temp. | Corrosion Meter Reading | Temp. | Corrosion Meter Reading |
| 0.00 | 491 | 470 | 388 | 628 | 297 | 645 |
| 1.00 | 525 | 473 | 446 | 608 | 391 | 655 |
| 13:00 | 510 | 477 | 416 | 635 | 362 | 652 |
| 18:00 | 522 | 478 | 432 | 622 | 383 | 654 |
| 37:30 | 523 | 478 | 435 | 620 | 387 | 653 |

Figure 9:
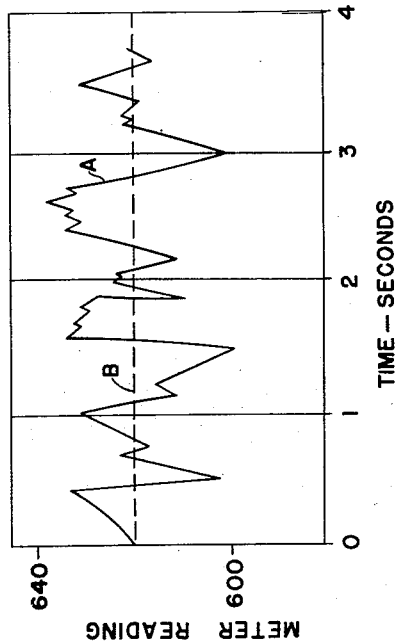
Figure 9 is a graph showing time vs. corrosion meter readings under conditions of rapid temperature fluctuation.

The results obtained from the corrosion test probe 120 in the condensing vapor are shown graphically in Figure 9 with times in seconds as the abscissas and the corrosion meter readings as the ordinates. Similar results could be plotted for the test probes 122 and 124 although, as seen from the table, the fluctuations are not of the same magnitude. From the erratic appearance of curve A, it is apparent that without means for overcoming the effect of rapid temperature fluctuations, the test results are subject to considerable error. By using the corrosion test probes of this invention, the curve is flattened as shown by dotted line B.

Although the invention has been described in relation to the specific embodiments shown in the drawings, these are not to be construed as limiting the scope thereof. In general, the invention is intended to encompass means for opening and closing the compartment containing the test specimens so that ingress and egress of the corrosive atmosphere can be controlled. The means for accomplishing this result and the mechanical embodiments thereof may be changed without departing from the invention. The various external and internal parts, such as the sleeves, base members, etc., may be any form as long as they are adapted to be inserted through the wall of a vessel containing a corrosive atmosphere in the form of vapor, liquid, or mixed phase, and sealed thereto. The sleeves and base members may be any tubular form including structures which are cylindrical, square, hexagonal, octagonal, etc., in cross-section. The apertures or ports through the walls of the sleeves may be any shape or size as long as the whole or parts thereof may be caused to register and close through movement of the sleeves in relation to each other. The movable sleeve may be external, if desired, and more than one movable or stationary sleeve may be used. As an alternative construction, threads 32 may be omitted and replaced by a slideable contact between base 10 and sleeve 34, and sleeve 46 may be fastened to base 10, making sleeve 34 the movable sleeve. Also, solenoid 54 may be mounted in reverse position between walls 36 and 48. The drawings omit various Teflon gaskets and other auxiliary equipment necessary to effect a pressure-type seal between the test-probe body and the wall of the vessel through which it is inserted.

Likewise, the sliding relationship of sleeve 98 within sleeve 90 through the back and forth movement of base member 70 may be altered without departing from the invention. Base member 70 may be moved by a solenoid connected between plate 74 and collar 72, or the solenoid may be attached to base member 70 at a point external to the test probe, that is, at the end where the lead wires extend. It is obvious that base member 70 may be rotated slightly to open and close the register between the co-operating apertures, or a combination of rotating and sliding movements may be used.

Various materials of construction may be used to fabricate the parts of the test probe, depending on the intended use. The parts may be fabricated from any materials which will withstand the action of the corrosive atmosphere with which it is to be used. In general, it is desirable that the collars be constructed of a material such as metals or metal alloys which will absorb heat and assume a condition of thermal equilibrium with the atmospheres to which they are exposed. The metal parts may be cast or machined. Steel, cast iron, aluminum, plastic, stainless steel and similar materials may be used for the parts. Since part of the function of the sleeve members is to seal off the passage of the corrosive atmosphere momentarily during the taking of a meter reading, the seal between their sliding contact surfaces should be as complete as possible without undue friction. For this purpose, the contact surfaces may be machined and polished. The parts which should be non-conductive to electricity may be made of hard rubber, plastic, various laminates, or Teflon. The test specimens are of course an electrically conductive material of construction for which the rate of corrosion is desired. The test specimens may be of the same material as the vessel wall which contains the corrosive atmosphere, or they may be any metal, or metal alloy, produced by any method of fabrication, for which rates of corrosion are desired.

The device of this invention may be used to test the action of any type of vapor, liquid or mixed phase corrosive atmosphere on a material of construction, be it a vessel wall, pipe, valve part, pump part, etc. To illustrate, the corrosive atmosphere may be concentrated or dilute mixtures or solutions of organic and inorganic salts, acids, bases, or gases including phenol, sulfuric acid, the halogen gases, the haloacids, nitric acid, sulfur dioxide, water and oxygen, steam, steam and air, phenol and hydrocarbons, alkali solutions used to treat hydrocarbon mixtures, fluorophosphoric acids, or any other corrosive atmosphere.

The only limitations attaching to the invention appear in the appended claims.

What is claimed is:

1. A corrosion test probe consisting of an elongated insulating base member having one end portion adapted to be mounted in sealed communication with a corrosive atmosphere in a vessel, an outer tubular member attached at one end to the end portion of said base member and having a transverse wall closing the opposite end, an inner tubular member reciprocally mounted in said outer tubular member, said inner tubular member having an open end adjacent said end portion of said base member and a second transverse wall closing the opposite end to form an enclosure, means between said transverse walls to reciprocate said inner tubular member, a plurality of ports through the walls of both said said outer tubular member and said inner tubular member, corrosion test specimens mounted on and extending from said end portion of said base member within the enclosure in said inner tubular member and spaced from the walls thereof, and said reciprocative means being adapted to move said inner tubular member to a position whereby said respective ports register to allow entry of said corrosive atmosphere into contact with said test elements within said enclosure and to another position whereby said ports are not in alignment to prevent entry of said corrosive atmosphere therein.

2. A corrosion test probe in accordance with claim 1 in which the abutment of the open end of said inner tubular member against the end portion of said base member defines the limit of reciprocation of said inner tubular member in one position of said reciprocative means.

3. A corrosion test probe in accordance with claim 1 in which said means to reciprocate said inner tubular member comprises a solenoid coil mounted on the inside of the transverse wall of said outer tubular member, a reciprocally mounted plunger within and extending from said coil, the extended end of said plunger being attached to the transverse wall of said inner tubular member and spring means between said transverse walls urging said inner tubular member and plunger toward said end portion of said base member.

4. A corrosion test probe consisting of a tubular housing member having a transverse wall at one end and a cylindrical plug member at the other end, an insulated base member extending reciprocally through said cylindrical plug member, a flange on the end of said base member, an inner tubular member reciprocally mounted within said tubular housing member, said inner tubular member being attached to said flange on said base member to define an enclosure for said atmosphere, corrosion test elements connected through and supported by said base member to extend within the enclosure in said inner tubular member, ports through the adjacent walls of said tubular housing member and said inner tubular member, said ports registering in one position of said base member and associated inner tubular member and not registering in another position thereof.

5. A corrosion test probe comprising an insulating base member having an elongated body and an enlarged end portion, a pair of corrosion test specimens supported by and extending from said enlarged end portion, an inner perforated housing encompassing said test specimens to define an enclosure for said atmosphere, said inner housing being attached to said enlarged end portion of said member, a collar encompassing the elongated body of said base member, a flange extending from said collar, an outer perforated housing encompassing said inner perforated housing and attached to said flange of said collar, said insulating base member, test specimens and inner housing being movable within said outer housing and collar respectively so as to open and close the registration of said respective perforations.

6. A corrosion test probe in accordance with claim 5 in which said inner housing is shorter than said outer housing and is slideably and rotatably mounted in said collar.

References Cited in the file of this patent
UNITED STATES PATENTS

| | | |
|---|---|---|
| 2,234,056 | Moore | Mar. 4, 1941 |
| 2,767,978 | Keefer | Oct. 23, 1956 |
| 2,830,261 | Estelle | Apr. 8, 1958 |
| 2,864,252 | Schaschl | Dec. 16, 1958 |